Feb. 27, 1923.
V. PUC
SEPARABLE FASTENER
Filed Aug. 1, 1919

1,446,768

Inventor
Vojtech Puc

By his Attorneys

Patented Feb. 27, 1923.

1,446,768

UNITED STATES PATENT OFFICE.

VOJTECH PUC, OF PRAGUE-VINOHRADY, BOHEMIA.

SEPARABLE FASTENER.

Application filed August 1, 1919. Serial No. 314,762.

*To all whom it may concern:*

Be it known that I, VOJTECH PUC, a citizen of the Czecho-Slovak Republic, residing at Prague-Vinohrady, in Bohemia, have invented certain new and useful Improvements in Separable Fasteners (for which I have filed applications in Austria March 21, 1916, Patent No. 76,404, and in Germany March 25, 1916, No. 295,067), of which the following is a specification.

This invention relates to separable fasteners of the kind generally known as press buttons or snap fasteners and which are composed of two members, a stud member and a socket member, which latter carries springs which engage the stud when the latter is in the socket. Each of said members is ordinarily formed with what are termed thread holes through which the thread is inserted when the members are being attached to the garment. Heretofore these thread holes have been formed in the body of the device and have not extended into or across the flanged or curled periphery or edge thereof, and for this reason the threads ordinarily lie above the body of the device and add to the thickness thereof.

According to my invention the thread holes are formed close to the edge or periphery of the base of the fastening device and also extend into the flanged or curled over edge or periphery of the base of the device, and are hence held below the surface of the body portion of the base.

Another feature of the invention consists in forming the thread holes close to the periphery of the base by suitably slitting the metal and then turning over and down the metal within the slits and curling it around the spring which the socket member contains.

In the accompanying drawings, I have illustrated the socket member, but some of the improvements may be applied to the stud member also.

Figure 1:
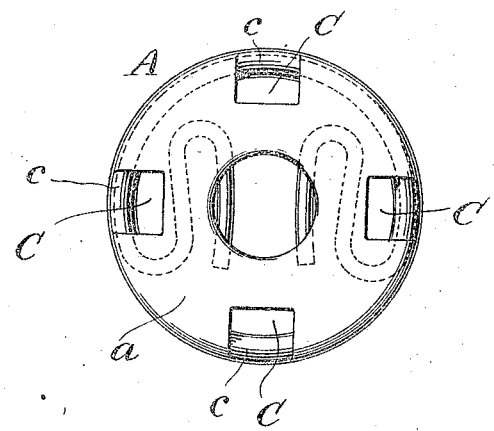
Figure 1 is a plan view of a socket member embodying my improvements.
Figure 2:
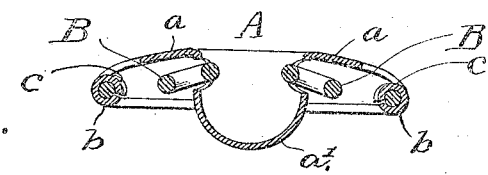
Figure 2 shows a transverse section of the same.
Figure 3:
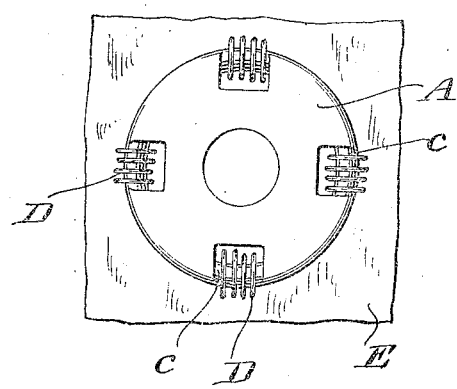
Figure 3 is a plan view showing how the fastener is applied to a piece of cloth.
Figure 4:
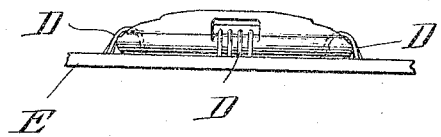
Figure 4 is a side elevation further illustrating the manner in which the fastener is applied to the cloth.

The socket member A comprises a body portion or base $a$ formed with a cap, hood or dome $a'$ of usual construction. B indicates springs of usual construction within the socket member. The edge or periphery of the base is bent or curled around the spring in the usual way as indicated at $b$ in Fig. 2. As thus far described the device is similar to known devices. C indicates thread holes formed in the body of the fastener. These are formed by slitting the metal and then turning down the portion $c$ within the slits and bending it over and around the spring in the manner clearly indicated in Figures 1 and 2. In this way an additional means is provided for holding the spring or springs in place. It will be observed that the slits extend into the edge or periphery of the body and hence when the threads D are applied to cloth E in the manner indicated in Figures 3 and 4 they will lie below the main body portion and a more secure fastening is provided, the threads being arranged below the highest part of the body.

As before stated the thread holes in the stud member of the fastener may be made in a similar way, but of course the stud member is not provided with springs and the bent over portions $c$ are merely bent and curled out of the way in the manner indicated.

By my improvements the button may have the necessary thickness to accommodate the spring and to provide a socket and the threads do not add to the thickness of the button. The threads bind the button closely and securely to the cloth and less thread is required.

The inwardly turned parts $c$ which embrace the spring not only serve as additional means for holding the spring in place but they provide curved or rounded portions on which the threads rest instead of sharp portions as heretofore which tend to cut the threads.

I claim as my invention:—

1. A snap fastener member made of sheet metal having a convex body portion and a curled periphery and having thread holes formed in its body portion near its periphery, the side walls of which extend to the extreme outer edge thereof, the outer wall of each thread hole having a curved bearing surface for the thread.

2. A snap fastener member having a curled peripheral or edge portion, a spring held by said curled peripheral edge portion and said member being provided with thread holes which extend into the peripheral portion of the member and which are provided with metal portions bent downwardly through the thread holes and engaging the spring.

3. A snap fastener member having a curled edge or periphery, and provided with thread holes formed by producing slits in the member and bending inwardly and curling the metal between the slits to form a part of the peripheral edge of the member.

In testimony whereof, I have hereunto subscribed my name.

VOJTECH PUC.